(No Model.)
J. & R. H. MOORE.
HOSE HOLDER.
No. 463,068. Patented Nov. 10, 1891.
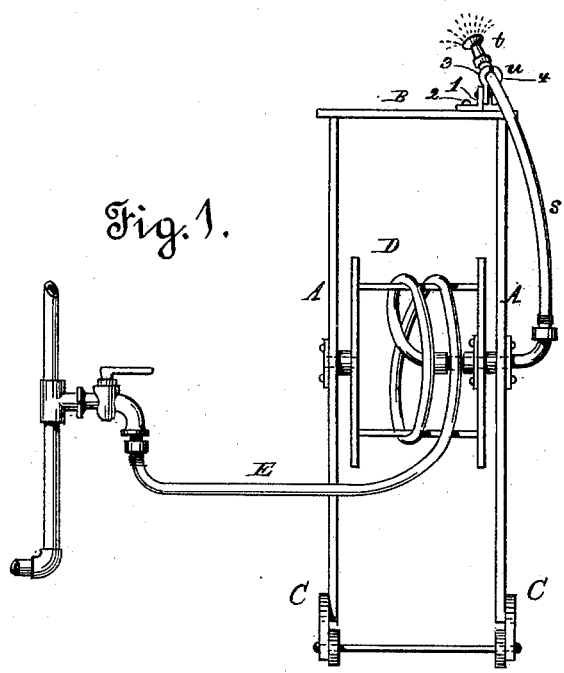
Fig. 1.
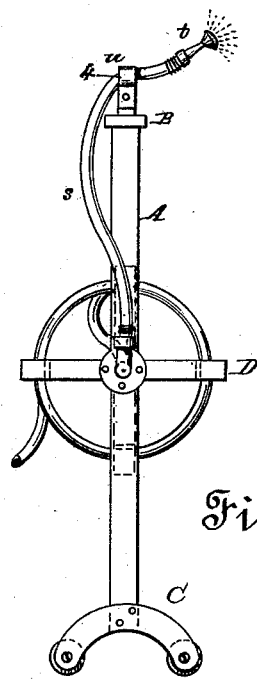
Fig. 2.
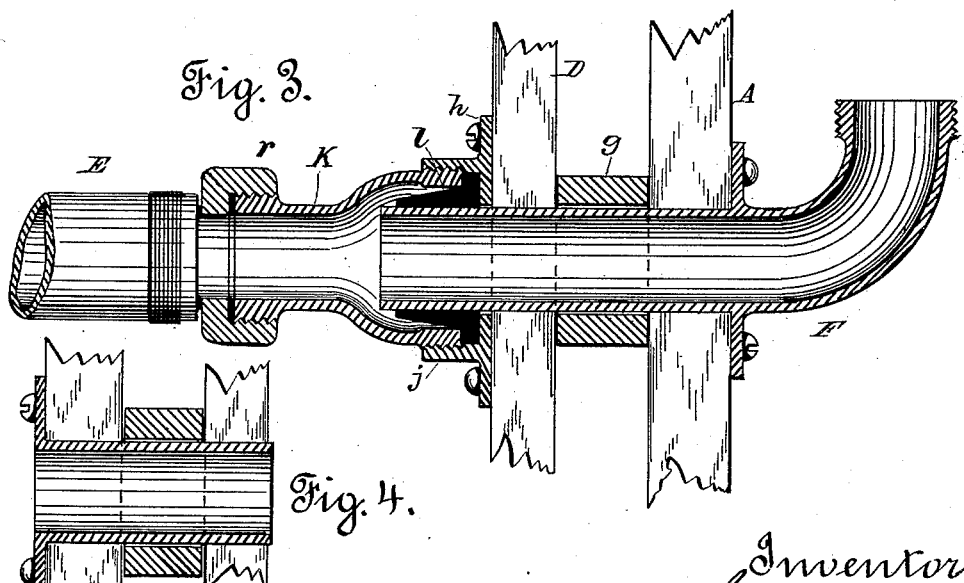
Fig. 3.
Fig. 4.
Witnesses.
Inventors
Joseph Moore
Ralph H Moore

UNITED STATES PATENT OFFICE.

JOSEPH MOORE AND RALPH H. MOORE, OF SAN FRANCISCO, CALIFORNIA; SAID JOSEPH MOORE ASSIGNOR TO SAID RALPH H. MOORE.

HOSE-HOLDER.

SPECIFICATION forming part of Letters Patent No. 463,068, dated November 10, 1891.

Application filed June 4, 1891. Serial No. 395,117. (No model.)

*To all whom it may concern:*

Be it known that we, JOSEPH MOORE and RALPH H. MOORE, citizens of the United States, residing at the city and county of San Francisco, and State of California, have invented certain new and useful Improvements in a Combined Hose, Hose-Reel, Barrow, and Sprinkler Stand; and we do hereby declare the following to be a full, clear, and exact description of said invention, such as will enable others skilled in the art to which it most nearly appertains to make, use, and practice the same.

The object of our invention is to construct and adapt an ordinary hand barrow and reel, such as is used for winding up and handling a garden-hose, so that it can also be used as a sprinkling-stand for the hose without removing the hose from the reel.

It consists in mounting one end of the reel upon a hollow trunnion, which extends through the side bar of the barrow, and then connecting one end of the hose with the hollow trunnion inside the reel, so that the length of hose can be wound upon the reel. A separate short section of hose has one end connected with the hollow trunnion outside the side bar of the barrow, and this section extends up to the top of the barrow, where its opposite end, to which the sprinkler is connected, is held in a clamp. The free end of the main hose can then be connected with a faucet or plug and the barrow wheeled to the point where the sprinkler is to stand and stood in its upright position. The water will then pass through the main hose, hollow trunnion, and short hose-section to the sprinkler, all as hereinafter more fully described.

Referring to the accompanying drawings, in which Figure 1 is a front view of the barrow in its upright position, showing the main hose connected with a faucet and passing around the reel, with its opposite end connected with the hollow trunnion and the short hose-section, clamp, and sprinkler. Fig. 2 is an edge or side view of same. Fig. 3 is an enlarged view of the hollow trunnion, showing the connection with the hose; and Fig. 4 is an enlarged view of a hollow reel-journal for the opposite end of the reel, which may be used or not, as desired.

Let A A represent the side bars of the barrow, B the hand-bar at their upper end, and C the foot or standing piece of the side bars for supporting the barrow in its upright position. These parts may be variously constructed, as they form no part of our invention.

D is the reel, which is mounted on journals between the side bars A A, and on which the hose E is wound and unwound.

The journal F, on which the reel is mounted at one end, we make hollow, as shown at Fig. 3. This hollow journal or trunnion passes through the side bar A, to which it is firmly secured, and extends through the end of the reel on the inside of the bar, a wooden or other block $g$ being introduced between the end of the reel and bar to serve as a washer, as shown. On the inside face of the end of the reel we secure a coupling-piece $h$, which has a short tubular projection $j$, the inner portion of which is tapped with screw-threads. The end of the hollow trunnion F projects through the center of this casting or coupling-piece a short distance, as shown at Fig. 3.

K is a short tubular coupling, the outer end of which is enlarged, and screw-threads are formed on its outer end, so that it can be screwed into the tubular projection $j$. A rubber or other washer $l$ is placed over the projecting end of the trunnion before the coupling-piece is screwed into the projection $j$, and this washer is made tapering toward the end of the trunnion, so that water can pass around in the enlargement and serve to press it to its seat when the water-pressure is on, thus preserving a water-tight joint where the tubular trunnion F passes through the end of the reel. The end of the hose E is secured to the end of the coupling-piece $k$ by a union-coupling $r$ in the usual way. The opposite end of the reel can be mounted on any suitable journal—such, for instance, as is represented at Fig. 4, or any other kind, tubular or solid. The reel can then be rotated on its bearings and the hose wound upon it.

The outer end of the tubular trunnion F is preferably bent upward on the outside of the side bar A, and one end of a short section of hose $s$ secured to it by any suitable coupling. This short section of hose extends up to the top of the barrow and has a sprinkler $t$ attached to its end, and it is held in a clamp $u$, which is secured to the hand-bar B of the barrow.

The clamp which we use is made in three pieces. One piece, marked 1, is angular in form, and one arm of the angle is secured to the cross-bar by a single bolt 2, so that it can be rotated around on the bolt as a center. The other two pieces 3 and 4 are made in the form of a clamp for the hose, and they have parallel extensions, through which a bolt passes horizontally and also through the projecting member of the angle-piece 1, so that the two clamping-pieces can be moved on the bolt-fastening in a vertical plane, thus providing a semi-universal adjustment of the clamp or hose-holder.

In use, the barrow and reel will serve as any ordinary barrow and reel, and when it is desired to use the hose, the free end of the hose can be connected with a faucet and the barrow run to any desired point, unwinding the reel as it goes. The barrow can then be stood upright and the water turned on. The barrow then serves as a stand for the hose and sprinkler, as will be readily understood from the drawing, Fig. 1.

If it is desired to use the hose as a hand-hose for promiscuous sprinkling, the sprinkler can be removed from the end of the short section of hose and placed on the free end of the long section. The end of the short section can then be connected with the faucet and the long hose be used as the sprinkling end.

Having thus described our invention, what we claim, and desire to secure by Letters Patent, is—

1. In a combined hose reel and barrow, the reel D, mounted on a hollow trunnion at one end, having an upturned portion, the hose-section connected to said upturned portion and resting and held at its upper end in a circularly-adjusted clamp held upon the reel-stand, a connecting or coupling piece $h$, secured to the end of reel, a coupling-piece $k$, with enlarged end adapted to screw into the coupling-piece $h$, over the end of the tubular trunnion, and an elastic washer $l$, adapted to fit over the trunnion and between the end of the coupling-piece $k$ and casting $h$, substantially as and for the purpose described.

2. A hose-clamp consisting of an angle-piece I, attached by a single bolt passing through one arm of the angle, and two clamping-pieces 3 and 4, attached to the projecting portion of the angle-piece by a single bolt in a plane at right angles to the plane of the bolted arm of the angle-plate, substantially as described.

JOSEPH MOORE.
RALPH H. MOORE.

Witnesses:
R. S. MOORE,
JOHN DYER.